United States Patent
Seibert

(10) Patent No.: US 6,944,288 B2
(45) Date of Patent: Sep. 13, 2005

(54) DOUBLE-TALK AND PATH CHANGE DETECTION USING A MATRIX OF CORRELATION COEFFICIENTS

(75) Inventor: Michael Seibert, Ottawa (CA)

(73) Assignee: Zarlink Semiconductor Inc., Kanata (CA)

(*) Notice: Subject to any disclaimer, the term of this patent is extended or adjusted under 35 U.S.C. 154(b) by 80 days.

(21) Appl. No.: 10/042,237

(22) Filed: Jan. 11, 2002

(65) Prior Publication Data
US 2002/0126834 A1 Sep. 12, 2002

(30) Foreign Application Priority Data
Jan. 11, 2001 (GB) .............................. 0100674

(51) Int. Cl.$^7$ .............................................. H04M 9/08
(52) U.S. Cl. ........................ 379/406.01; 379/406.02; 379/406.04; 379/406.05; 379/406.06; 379/406.08; 379/406.09; 379/406.11
(58) Field of Search ................... 379/406.01–406.14

(56) References Cited

U.S. PATENT DOCUMENTS

| | | | | |
|---|---|---|---|---|
| 5,062,102 A | * | 10/1991 | Taguchi | 379/406.09 |
| 5,193,112 A | * | 3/1993 | Sano | 379/406.09 |
| 5,206,854 A | * | 4/1993 | Betts et al. | 379/406.01 |
| 5,987,143 A | * | 11/1999 | Okuno et al. | 381/66 |
| 6,035,034 A | | 3/2000 | Trump | 379/410 |
| 6,137,881 A | | 10/2000 | Oh et al. | 379/410 |
| 6,226,380 B1 | * | 5/2001 | Ding | 379/406.01 |

FOREIGN PATENT DOCUMENTS

| | | |
|---|---|---|
| WO | WO 98/28857 | 7/1998 |
| WO | WO 98/44650 | 10/1998 |
| WO | WO 00/3831 | 6/2000 |

OTHER PUBLICATIONS

Benesty et al, "N New Class of Doubletalk Detectors Based on Cross–Correlation", 2000, Ieee Trans. on Speech and Audio Processing, vol. 8, No. 2, Mar. 2000, pp. 168–172.*

Cho et al ; "An Objective Technique for Evaluating Double-talk Detectors in Acoustic Echo Cancelers", IEEE Trans. on Speech and Audio Processing, vol. 7, No. 6, Nov. 199; pp. 718–724.*

(Continued)

*Primary Examiner*—Sinh Tran
*Assistant Examiner*—Ramnandan Singh
(74) *Attorney, Agent, or Firm*—Marks & Clerk; Richard J. Mitchell

(57) ABSTRACT

A process is described which generates matrix coefficients using zero-lag auto and cross-correlations from signals commonly found in echo cancellers. Double-talk and path changes are then detected using matrix operations such as determinants, eigendecompositions, or singular value decompositions (SVDs). In a preferred embodiment, the determinant of the correlation-based matrix is compared against predetermined threshold values.

9 Claims, 3 Drawing Sheets

OTHER PUBLICATIONS

Asharif et al, "Correlation LMS Algorithm and its application to Doubletalk echo canceling", Electronic Letters; Feb. 4, 1999, vol. 35, No. 3; pp. 194–195.*

Knapp et al , The Generalized Correlation Method for Estimation of Time Delay, 1976, IEEE Trans. on Acoustics, Speech, and Signal Processing, vol. ASSP–24, No. 4, Aug. 1976; pp. 320–327.*

"A double–talk detector based on coherence", Tomas Gansler et al., IEEE Transactions on Communications, vol. 44, No. 11, Nov. 1996, pp. 1421–1427.

"On detection of double talk and changes in the echo path using a markov modulated channel model", Catharina Carlemalm et al., IEEE, 1997, pp. 3869–3872.

"On the problem of detection and discrimination of double talk and change in the echo path", Catharina Carlemalm et al., IEEE, 1996, pp. 2742–2745.

"A frequency–domain double–talk detector based on a normalized cross–correlation vector", T. Gansler et al., Signal Processing, 81, 2001, pp. 1783–1787.

"A new double–talk detection algorithm based on the orthogonality theorem", Hua Ye et al., IEEE, 1991, pp. 1542–1545.

"An objective technique for evaluating doubletalk detectors in acoustic echo cancelers", Jun H. Cho et al, IEEE Transactions on Speech and Audio Processing, vol. 7, No. 6, Nov., 1999.

* cited by examiner

DOUBLE-TALK AND PATH CHANGE DETECTION USING A MATRIX OF CORRELATION COEFFICIENTS

BACKGROUND OF THE INVENTION

1. Field of Invention

This invention relates to a method of detecting double-talk and path changes in echo cancellation systems. Echo cancellation is used extensively in telecommunications applications to recondition a wide variety of signals, such as speech, data transmission, and video.

2. Description of Related Art

The search for an effective echo cancellation procedure has produced several different approaches with varying degrees of complexity, cost, and performance. A traditional approach to echo cancellation uses an adaptive filter of length L, where L equals the number of samples necessary to extend to just beyond the duration of the echo. Typically, the adaptive filters contain either 512 or 1024 taps. At the standard telephone bit rate of 8000 samples per second, this provides the ability to adapt to echo paths as long as 64 ms and 128 ms, respectively.

The computational requirements of an adaptive filter are proportional to L for the popular LMS (Least Mean Squares) class of algorithms, and proportional to $L^2$ or higher for algorithms such as RLS (Recursive Least Squares). More robust algorithms (like RLS) have greatly improved convergence characteristics over LMS methods, but the $L^2$ computational load makes them impractical with current technology. For this reason, the LMS algorithm (and its variants) tends to remain the algorithm of choice for echo cancellation.

Practical echo cancellation devices must provide some means of avoiding divergence from double-talk. The double-talk condition arises when there is simultaneous transmission of signals from both sides of the echo canceller due to the presence of near-end speech in addition to the echo. Under such circumstances, the return echo path signal, $S_{IN}$ (see FIG. 1), contains both return echo from the echo source signal, and a double-talk signal. The presence of a double-talk signal will prevent an LMS-based echo canceller from converging on the correct echo path. It will also cause a pre-converged echo canceller to diverge to unpredictable states. Following divergence, the echo canceller will no longer cancel the echo, and must reconverge to the correct solution. Such behaviour is highly unacceptable, and is to be avoided in actual devices. Some means of detecting double-talk must therefore be implemented. To prevent divergence, the LMS filter coefficients are typically frozen during the presence of double-talk.

Detecting double-talk quickly and reliably is a notoriously difficult problem. Even a small amount of divergence in a fully converged LMS filter will result in a significant increase in the residual echo level. The use of a fast and reliable double-talk detector is crucial to maintain adequate subjective performance.

The simplest, and perhaps most common, method for detecting double-talk is to use signal levels. The echo path typically contains a minimum amount of loss, or reduction, in the return signal. This quantity is often referred to as the Echo Return Loss, or ERL. In most systems, this is assumed to be at least 6 dB. In other words, the return signal $S_{IN}$ will be at a level which is at least 6 dB lower than $R_{OUT}$ provided that there is no double-talk. In the presence of double-talk, the level at $S_{IN}$ often increases so that it is no longer 6 dB lower than $R_{OUT}$. This condition provides a simple and convenient test for double-talk.

The problem with this approach is that the double-talk detector must have an accurate estimate of the echo path ERL in order to determine if the level at $S_{IN}$ is too high. However, precise knowledge of the ERL is generally not available. If the ERL estimate is too high, the double-talk detector may trigger unnecessarily. Conversely, it may not trigger at all if the ERL estimate is too low.

Another problem with this technique is that it will only reliably detect high-level double-talk. If the double-talk signal is at a much lower level than the echo source signal, low-level double-talk occurs. Under this condition, the increase in the level of $S_{IN}$ is usually very small. The double-talk detector may fail to trigger, but noticeable divergence in the LMS filter can still occur.

To detect low-level double-talk, the level of the residual echo signal ($S_{OUT}$) is often monitored. If no double-talk or background noise is present, and the LMS filter is fully converged, $S_{OUT}$ can be as much as 40 dB lower than $R_{OUT}$. Assuming that the echo path remains constant, any increase in $S_{OUT}$ will likely be due to double-talk. Of course, if the echo path does change, it will be mistaken for double-talk. So if this method is used, a separate path change detection algorithm must be employed. A unified approach would be simpler and preferred.

Correlation is a statistical function which is commonly used in signal processing. It can provide a measure of the similarity between two signals (cross-correlation), or a single signal and time-shifted versions of itself (autocorrelation). The use of correlation for double-talk detection per se is known. Several patents exist for correlation-based double-talk detection, including U.S. Pat. Nos. 5,646,990, 5,526,347 and 5,193,112. The correlation-based approaches taken in prior-art methods generally involve the calculation of a single cross-correlation coefficient, usually between $R_{IN}$ and $S_{IN}$. The problem with this technique is that the degree of correlation can vary widely with different signals and echo paths. This makes it very difficult to set thresholds on the correlation coefficient in order to determine what state the echo canceller is in.

SUMMARY OF THE INVENTION

A process has been developed which generates matrix coefficients using zero-lag auto and cross-correlations from signals commonly found in echo cancellers. Double-talk and path changes are then detected using matrix operations such as determinants, eigendecompositions, or singular value decompositions (SVDs).

The correlations between various signals in an echo canceller will change depending on what state the echo canceller is in, i.e. if it is converged, unconverged, or in double-talk. By arranging the various correlations in appropriate matrix form, key information about the state of the echo canceller can be extracted by performing various matrix operations. The preferred operation is to take the determinant, but eigendecompositions and singular value decompositions (SVDs) can also be used. A novel aspect of the invention is the formulation of a matrix using various correlation coefficients, and the subsequent analysis of this matrix to determine the state of the echo canceller.

Accordingly the present invention provides a method of detecting double-talk and path changes in an echo cancellation system, comprising generating a correlation-based matrix of signals in said echo cancellation system; and analyzing said correlation-based matrix to identify double-talk and path changes occurring in said system.

In the preferred embodiment, the correlation-based matrix is generated using the return echo signal ($S_{IN}$) and the output of an LMS adaptive filter.

The invention provides a correlation-based matrix generated using zero-lag auto and cross-correlations of signals commonly found in echo cancellers.

Double-talk and path changes are detected by analysis of the correlation-based matrix. Possible analysis techniques include condition numbers, determinants, eigendecompositions, and singular value decompositions.

In the preferred embodiment, determinants are used to detect double-talk and path changes.

The invention can be implemented using either the time-domain or frequency-domain in a digital signal processor using conventional digital signal processing techniques.

The invention also provides a double-talk and path change detector, comprising a processing element generating a correlation-based matrix of signals in said echo cancellation system; and a processing element for analyzing said correlation-based matrix to identify double-talk and path changes occurring in said system.

BRIEF DESCRIPTION OF THE DRAWINGS

The invention will now be described in more detail, by way of example only, with reference to the accompanying drawings, in which.

DETAILED DESCRIPTION OF THE INVENTION

Figure 1:
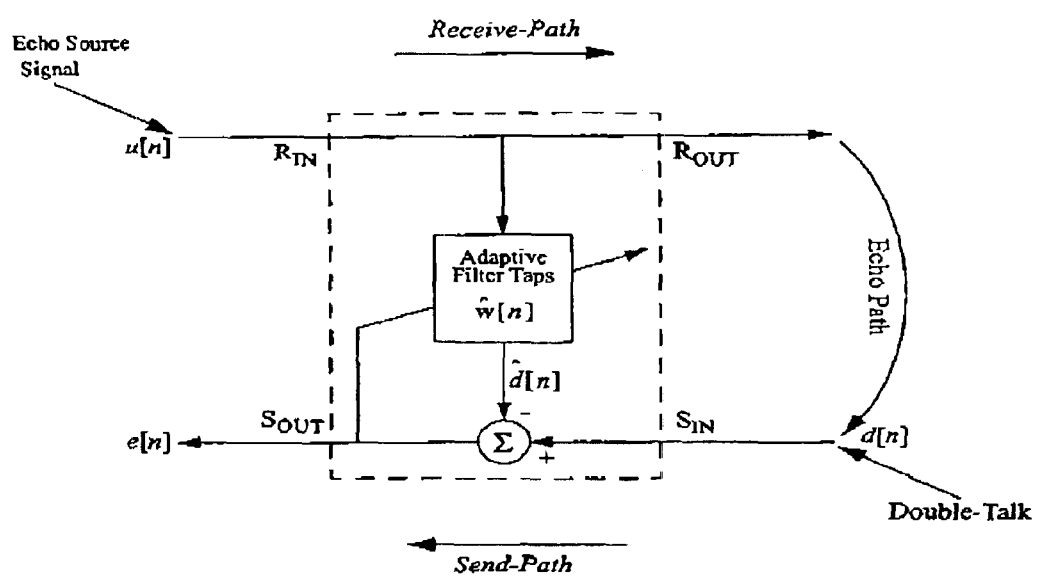
FIG. 1 is a schematic diagram of an echo canceller using LMS Adaptive Filtering.

The layout of a typical LMS-based echo canceller is shown in FIG. 1. It contains two signals, travelling along a "send" path and a "receive" path. The echo source signal enters the echo canceller as $R_{IN}$ and leaves as $R_{OUT}$. The send path input, $S_{IN}$, consists of a double-talk signal (if present) plus the echo source signal after it has travelled along the echo path. By estimating the echo path, a synthetic echo signal can be generated to cancel the echo in the send path. The echo cancelled signal leaves as $S_{OUT}$.

The LMS filter attempts to cancel the echo by adjusting itself to suppress the output signal at $S_{OUT}$. Obviously, if $S_{IN}$ contains components other than echoed speech from the echo source, the LMS filter will not converge to the correct solution; hence the need for double-talk detection.

The preferred embodiment of the algorithm for this patent uses the Normalized-LMS (N-LMS) algorithm. Mathematically, the adaptive filter tap-weight update procedure for the N-LMS algorithm consists of the following three equations $$\hat{d}[n] = \hat{w}^H[n]u[n]$$

$$e[n] = d[n] - \hat{d}[n]$$

$$\hat{w}[n+1] = \hat{w}[n] + \frac{\mu}{a + \|u[n]\|^2} u[n]e[n]$$

where $u[n] = R_{IN}$ = echo source signal $\hat{w}[n]$ = LMS filter coefficients $d[n] = S_{IN}$ = desired LMS output (echo+double-talk)

$\hat{d}[n]$ = LMS output (estimated echo)

$e[n] = S_{OUT}$ = LMS error signal $\mu$ = LMS step-size parameter a = A small constant (provides numerical stability).

The location of these signals in the echo canceller is also shown in FIG. 1. The N-LMS algorithm well known to persons skilled in the art and a more detailed treatment is readily available in most adaptive filtering texts. See, for example, S. Haykin, Adaptive Filter Theory, Prentice-Hall, Upper Saddle River, N.J. (1996), the contents of which are herein incorporated by reference.

One of the key parameters in the N-LMS algorithm is the LMS step-size parameter $\mu$. This parameter controls both the speed and accuracy of convergence. The larger $\mu$ is, the faster the algorithm will converge on the echo path, but the less accurate the steady-state solution will be. To guarantee convergence of the N-LMS algorithm, $\mu$ must be less than 2.

A common technique is to adjust the value of $\mu$ based on the state of the echo canceller. In an unconverged state (such as at start-up, or following a path change), it is desirable to use a large value for $\mu$ to permit rapid initial convergence. Once the LMS filter has achieved a reasonable degree of convergence, $\mu$ can be reduced. This not only allows for a slightly more accurate solution (and therefore more cancellation), but it will also slow potential divergence from double-talk. To stop adaptation altogether, $\mu$ can simply be set to zero. The double-talk and path change detectors can therefore control the operation of the LMS filter by varying the value of $\mu$.

A double-talk detection algorithm in accordance with a preferred embodiment of the invention that is designed to work in conjunction with the echo canceller described illustrated in FIG. 1 will be described. This is implemented in a digital signal processor.

Consider two signals, $X_0[n]$ and $X_1[n]$ generated by a linear combination of two real-valued source signals, $S_0[n]$ and $S_1[n]$. Mathematically, this mixing process may be described as $$X = H_{i,0} \cdot S_0 + H_{i,1} \cdot S_1,$$

where $H_{i,j}$ are the mixing coefficients. In matrix form, this may be written as $$X = H \cdot S$$

where $$\mathbb{X} = \begin{bmatrix} X_0 \\ X_1 \end{bmatrix}, \mathbb{H} = \begin{bmatrix} H_{0,0} & H_{0,1} \\ H_{1,0} & H_{1,1} \end{bmatrix} \text{ and } \mathbb{S} = \begin{bmatrix} S_0 \\ S_1 \end{bmatrix}$$

A matrix R is defined as $$R = E[\mathbb{X}\mathbb{X}^T]$$

where E[. . .] is the statistical expectation operator. R may be expanded in two ways $$\mathbb{R} = E\begin{bmatrix} X_0 X_0^T & X_0 X_1^T \\ X_1 X_0^T & X_1 X_1^T \end{bmatrix}$$

$$= E[\mathbb{H}\mathbb{S}\mathbb{S}^T\mathbb{H}^T]$$

From the first expansion, it is apparent that the diagonal terms in R are the zero-lag autocorrelations of $X_0[n]$ and $X_1[n]$ and that both off-diagonal terms correspond to the zero-lag cross-correlation between $X_0[n]$ and $X_1[n]$. Hence, R is a symmetric, correlation-based matrix.

From the second expansion, we see that if H is full-rank, then R will also be full-rank if $S_0[n]$ and $S_1[n]$ are both non-zero and uncorrelated. In most cases, a sufficient condition for this is that $S_0[n]$ and $S_1[n]$ are different signals from different sources.

The way in which the matrix can be used to perform double-talk and path change detection will now be explained. First, suppose we generate the signal mixtures in using convolutions:

$$X = H \circledast S$$

Now the terms in the mixing matrix can be vectors. We further impose the condition that H have the following form:

$$\mathbb{H} = \begin{bmatrix} H_{0,0} & 1 \\ H_{1,0} & 0 \end{bmatrix}$$

Figure 3:
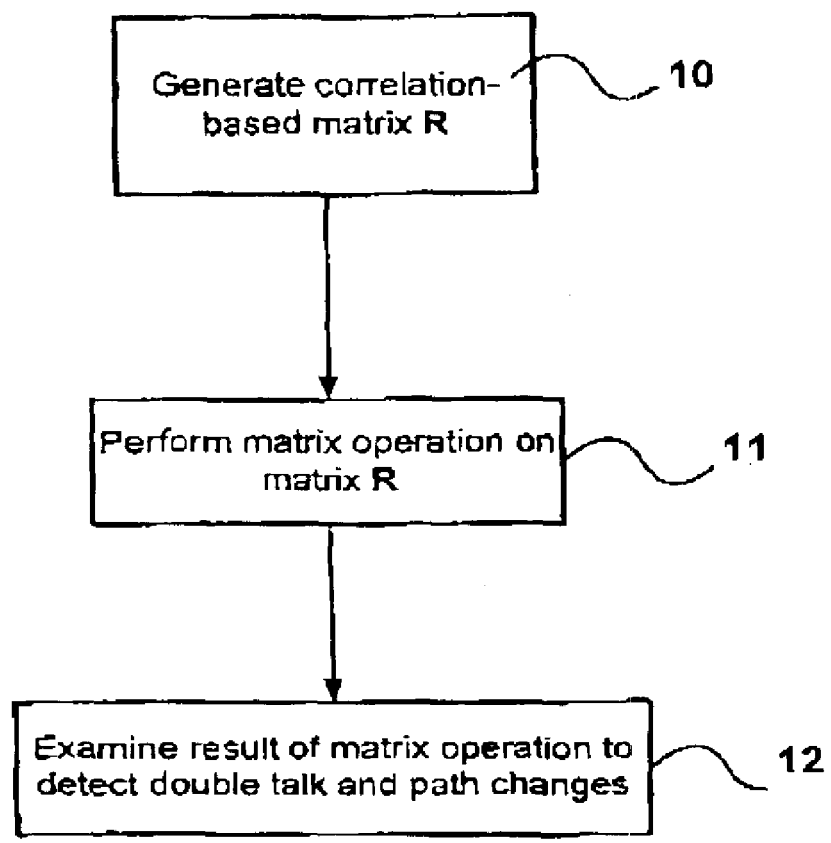
FIG. 3 illustrates the process of detecting double-talk.

With H defined in this way, it is now possible to connect the terms in the preceding equations with the parameters available in the echo canceller layout shown in FIG. 1 Let $S_0$=echo source signal=$R_{IN}$=$u[n]$ $S_1$=double-talk signal $H_{00}$=echo path $H_{1,0}$=LMS filter coefficients=$\hat{w}[n]$ With these definitions, it is apparent that $X_0 = H_{0,0} \circledast S_0 + S_1 = S_{IN} = d[n]$ $X_1 = H_{1,0} \circledast S_0 = \hat{d}[n]$ As shown in FIG. 3, in practising the invention, a first step 10 is performed to generate the correlation-based matrix R from $X_0$ and $X_1$. A matrix operation 11, for example, forming the determinant is next performed on the determinant, and the result of the matrix operation is then examined at step 12 to detect double-talk and path changes. In the case of the determinant, this is compared with a threshold value.

The question of what happens to R under the various states of echo canceller operation will now be examined.

Case 1: Unconverged, No Double-talk

If the LMS filter is in an unconverged state, $H_{0,0} \neq H_{1,0}$. This situation occurs when the echo canceller is first started, or following a major echo path change. Since the LMS filter does not contain an accurate echo path estimate, $X_0 \neq X_1$, and R will be full rank (unless $H_{1,0}=0$, but this condition is usually temporary) with a very low condition number. See, for example, G. H. Golub and C. F. Van Loan, Matrix Computations, 3rd ed., Johns Hopkins University Press, Baltimore, Md. (1996). ($\kappa \sim 10^1$). As convergence proceeds, the degree of correlation between $X_0$ and $X_1$ and increases. This has the effect of rapidly raising the condition number of R. As a result, the determinant of R will fall, and its eigenvalues and singular values will become increasingly disparate.

Case 2: Converged, No Double-talk

In this state $H_{0,0} \approx H_{1,0}$, so $X_0 \approx X_1$. This will make R very nearly rank deficient, and its condition number very large ($\kappa \sim 10^6$). Since R is close to being singular, its determinant will become very small. Similarly, we would expect to find only one significant eigenvalue or singular value.

Case 3: Double-talk

When double-talk is occurring, $X_0$ contains components from both $S_0$ and $S_1$, while $X_1$ is derived solely from $S_0$. In this case, $X_1$ and $X_0$ and are highly uncorrelated. R will have a low condition number, and this will be sustained for the duration of the double-talk. The higher the double-talk level, the lower the condition number becomes. This will raise the determinant of R, and we will find two significant eigenvalues and singular values.

Once the matrix R is generated, a variety of operations are available to determine what state the echo canceller is in. The condition number, determinant, eigenvalues and singular values of can all be used to test for double-talk or path changes. The determinant is used in the preferred embodiment because it is the simplest matrix operation to perform.

Figure 2A:
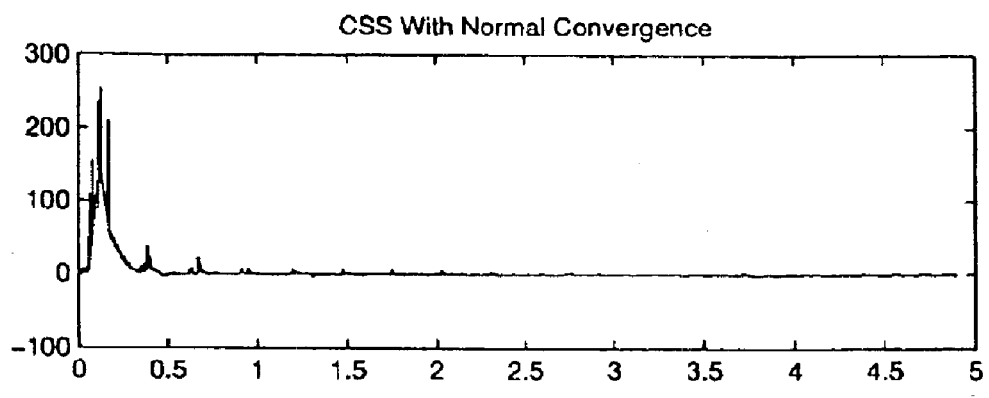
FIG. 2a is a plot showing the value of det [R] under normal convergence.
Figure 2B:
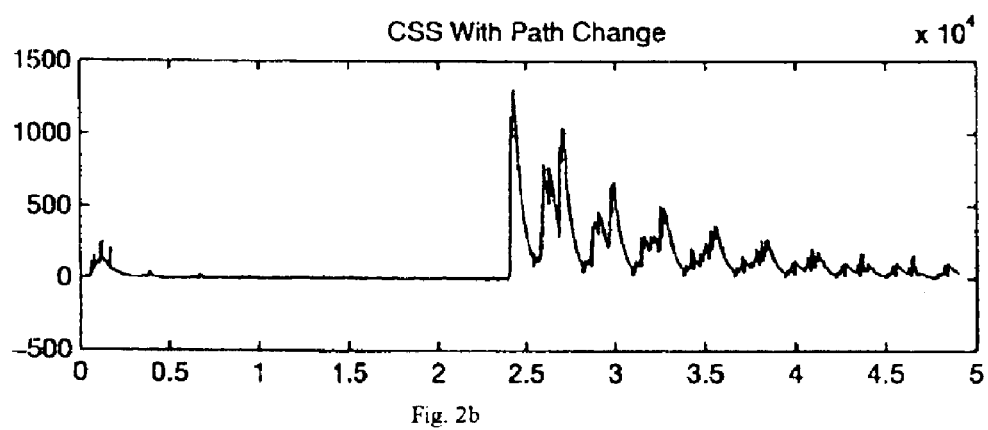
FIG. 2b is a plot showing the value of det [R] with a path change.
Figure 2C:
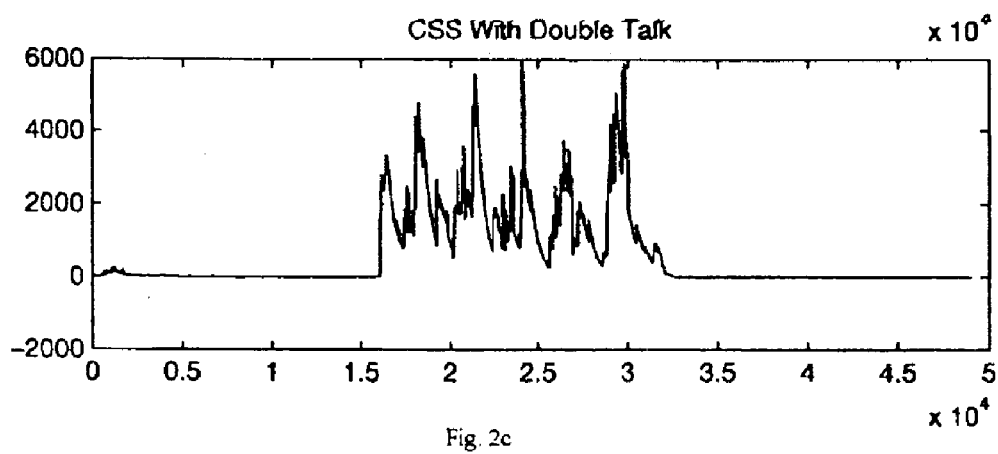
FIG. 2c is a plot showing the value of det [R] with double-talk.

To illustrate the effectiveness of this algorithm at detecting double-talk and path changes, simulations were carried out and the results are shown in FIG. 2. The plots indicate the value of det [R] under normal convergence, a path change, and double-talk. The scaling of the y-axis on the plots clearly demonstrates the variations observed in det [R] under the three different states. The simulations were carried out using ITU CSS synthetic speech signals from the G.168 Digital Echo Canceller standard. ITU-T Recommendation G.168, Digital Echo Cancellers. The signals were 48000 samples long, and a 60 ms echo path was used (which was changed to 15 ms during the path change simulation).

Under normal convergence (FIG. 2a), det [R] rapidly decays to near-zero values. When a path change occurs (FIG. 2b), det [R] spikes to a large value and then decays (to emphasize this trend, convergence was slowed by a factor of 10 following the path change). With double-talk (bottom plot), even larger, but sustained, spikes are present in det [R]. The differences in these three plots make it very easy to tell what state the echo canceller is in simply by checking the level of det [R]. The highest levels indicate double-talk, medium levels (along with decay) occurs with path changes, and very low levels are characteristic of full convergence. Based on these results, thresholds can be set as follows:

Normal (converged) operation.

Path change detected.

Double-talk detected.

Once the state of the echo canceller is determined, the LMS filter operation can be adjusted accordingly.

A well-known relation in signal processing is that the convolution of two signals in time is equivalent to the multiplication of their frequency spectra. This property makes it possible to propose a variation on the preceding algorithm in which frequency-domain versions of the signals are used. X has been defined in the time-domain using convolutions:

$$X[n] = H[n] \circledast S[n]$$

By taking the Fourier Transform of all terms involved, it is possible to rewrite the above equation in the frequency-domain as $$X(f_k) = H(f_k) \cdot S(f_k)$$

for all frequencies in the range $0 \leq f_k \leq F_S/2$ where $F_S$ is the sampling frequency of the signals. The generation and analysis of the correlation-based matrix R is carried out as before, only now R is created using the frequency-domain version of X.

The advantage to this approach is that the algorithm no longer needs to have an accurate echo path estimate for R to have a high condition number during non-double-talk states. The double-talk detector becomes completely insensitive to path changes. Depending on the application, this may or may not be a desirable property. Low-level double-talk detection abilities improve, but a separate path change detection scheme must now be used.

Implementation of a frequency-domain version of this process can be accomplished through the use of Fast Fourier Transforms (FFTs) or subbanding techniques.

As will be understood by persons skilled in the art the inventive process can be implemented in a digital signal processor or other suitable digital signal processing device.

Glossary

Adaptive Filter: A filter whose coefficients can be adjusted during operation. Adaptive filters are used to estimate unknown parameters, for example an unknown echo path.

Autocorrelation: A statistical quantity which roughly measures the similarity of a signal to time shifted versions of itself.

Condition Number: A measure of how close a matrix is to being singular. The condition number for an arbitrary matrix A is given by $\kappa(A)=\|A\|\|A^{-1}\|$.

Convergence: The condition achieved when the LMS filter has accurately modelled the echo path and is no longer undergoing significant changes. At convergence, the LMS filter is cancelling the maximum amount of echo.

Cross-Correlation: A statistical quantity which roughly measures the similarity of two separate signals.

Divergence: The process by which the LMS filter coefficients move away from the actual echo path to erroneous and unpredictable solutions. During divergence, the amount of echo being cancelled becomes less and less.

Double-Talk: The condition which occurs during simultaneous transmission of signals from both sides of the echo canceller.

Echo Path: A mathematical description of the process which imparts an echo to a signal.

ERL: Echo Return Loss. The loss a signal experiences as it travels along the echo path from $R_{OUT}$ to $S_{IN}$.

ERLE: Echo Return Loss Enhancement. A common method of measuring the performance of an echo canceller. This measurement represents the amount that an echo signal has been reduced from $S_{IN}$ to $S_{OUT}$.

LMS Algorithm: Least Mean Squares algorithm. Common adaptive filtering technique.

N-LMS Algorithm: Normalized Least Mean Squares algorithm. A variation on standard LMS in which the tap-weight update term is scaled by the inverse of the input signal power.

Rank: The number of non-zero eigenvalues or singular values a matrix has. Full-rank matrices have a non-zero determinant, and are thus non-singular and invertible.

RLS Algorithm: Recursive Least Squares algorithm. Common adaptive filtering technique.

It will be appreciated by one skilled in the art that many variations of the invention are possible without departing from the scope of the appended claims.

What is claimed is:

1. A method of detecting double-talk and path changes in an echo cancellation system including a Least Mean Squares adaptive filter for generating an echo cancellation signal and having an echo path between a received path and a send path, and wherein a send path signal at an input to said send path comprises an echo source signal after said echo source signal has travelled said echo path and in the event that double-talk is present a double-talk signal, said method comprising:

generating a cross correlation matrix $$R=E[xx^T]$$

where

E is the statistical expectation operator and $$\mathbb{X} = \begin{bmatrix} X_0 \\ X_1 \end{bmatrix} \text{ where }$$

$X_0$ is said send path signal and $X_1$ is an estimated echo signal generated by said adaptive filter; and performing a matrix operation on said matrix R to generate a characteristic value determinative of the correlation between said signals $X_0$ and $X_1$;

detecting the presence of double-talk and path changes occurring in said system from said characteristics value; and adjusting the operation of said adaptive filter in response to said detecting step.

2. A method as claimed in claim 1, wherein said characteristic value is the determinant of said matrix.

3. A method as claimed in claim 2, wherein said double-talk and path changes are inferred when said determinant passes predetermined threshold values.

4. A method as claimed in claim 1, wherein said characteristic value comprises eigendecompositions of said matrix.

5. A method as claimed in claim 1, wherein said characteristic value comprises single valued decompositions of said matrix.

6. A method as claimed in claim 1, wherein said characteristic value comprises condition numbers of said matrix.

7. A method as claimed in claim 1, wherein said Least Mean Square filter implements a normalized-LMS algorithm.

8. A method as claimed in claim 1, wherein the elements of said matrix are generated in the time domain.

9. A method as claimed in claim 1, wherein the elements of said correlation-based matrix are generated in the frequency domain.

* * * * *